G. E. WASON.
KITCHEN STOVE.
APPLICATION FILED MAR. 8, 1918.

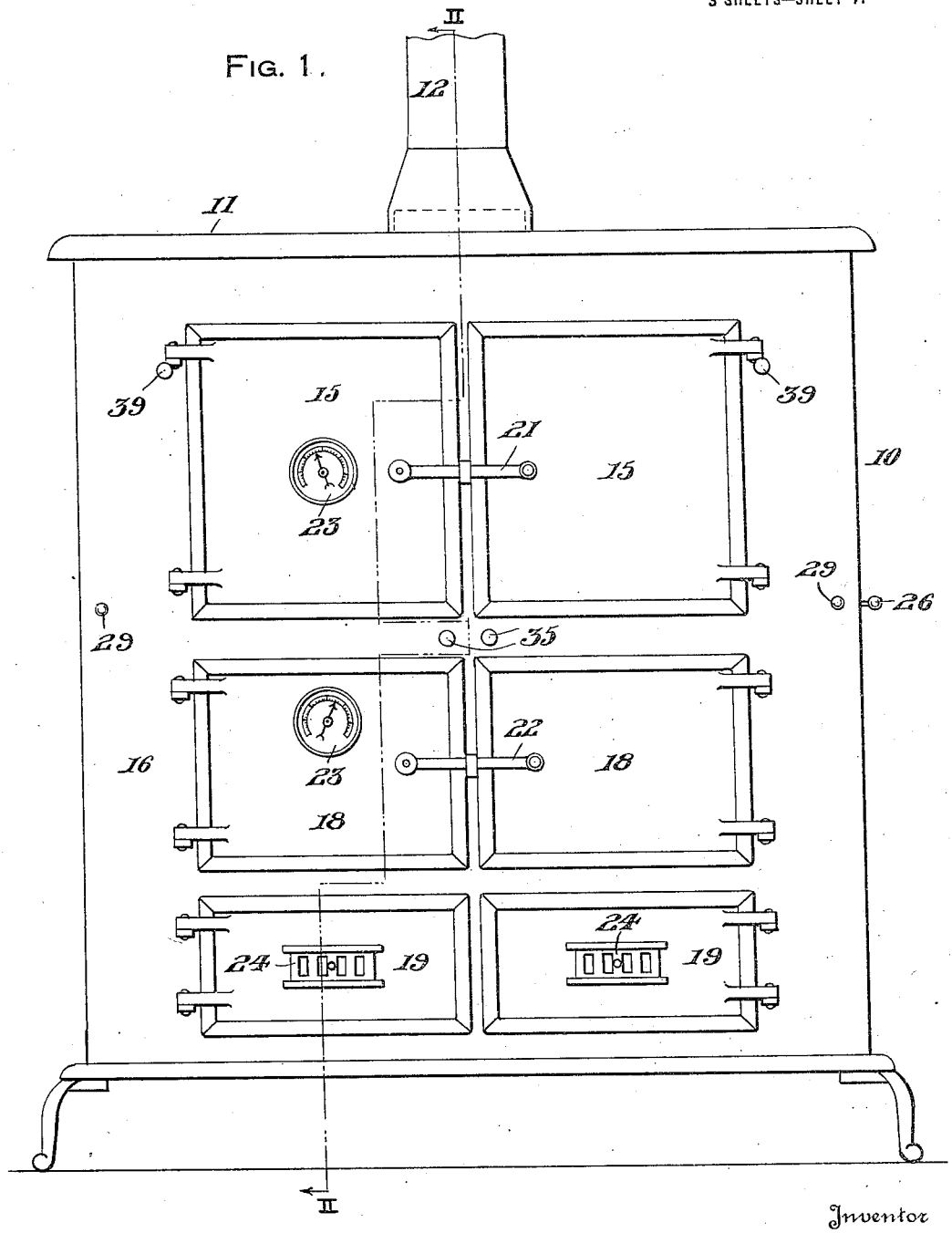

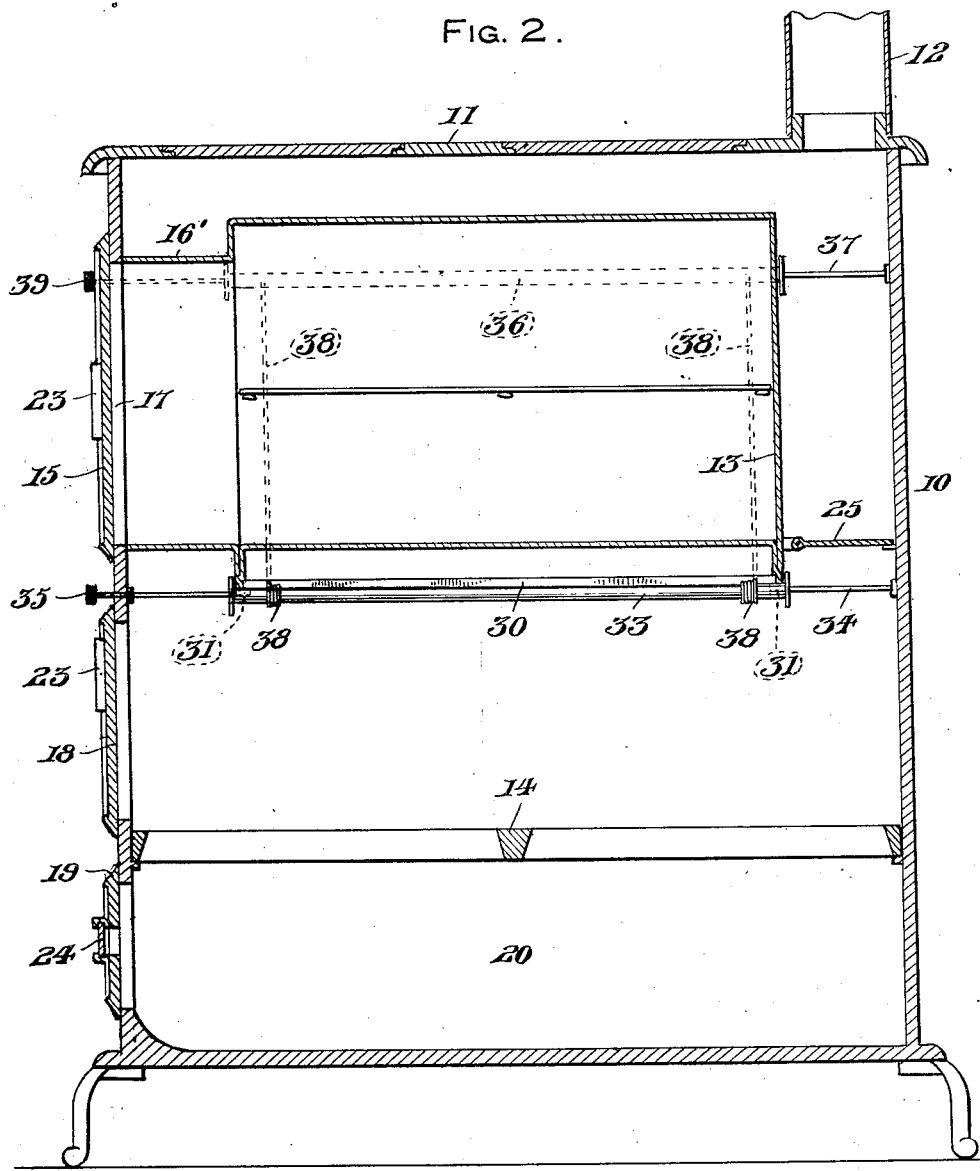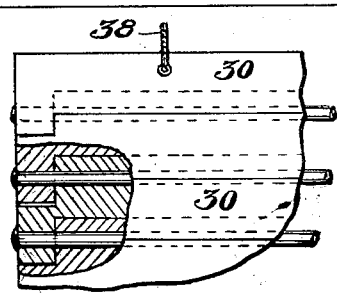

1,275,510.

Patented Aug. 13, 1918.
3 SHEETS—SHEET 3.

Inventor
G. E. Wason
By A. M. Wilson
Attorney

UNITED STATES PATENT OFFICE.

GEORGI E. WASON, OF SAULT STE. MARIE, ONTARIO, CANADA, ASSIGNOR OF ONE-THIRD TO PANKO WENGER, OF SAULT STE. MARIE, ONTARIO, CANADA.

KITCHEN-STOVE.

1,275,510.     Specification of Letters Patent.     Patented Aug. 13, 1918.

Application filed March 8, 1918. Serial No. 221,145.

*To all whom it may concern:*

Be it known that I, GEORGI E. WASON, subject of the Emperor of Austria, residing at Sault Ste. Marie, in the Province of Ontario, Dominion of Canada, have invented certain new and useful Improvements in Kitchen-Stoves, of which the following is a specification.

The primary object of the invention is the provision of a stove structure adapted for readily regulating the temperature within the oven portion thereof without affecting the fire or heat-generating means employed for the stove.

A further object of the invention is to provide a cooking and baking stove with adjustable heat-baffling means for the cooking section of the stove readily operable, the passage of the heat being also controlled around the said cooking section.

A still further object of the invention is to provide a stove having a baking oven with adjustable heat-shielding means capable of movement partially around the oven for arrangement adjacent the sides or bottom thereof as found desirable during the operation of the oven.

In the drawings forming a part of this application and in which like numerals refer to corresponding parts throughout the several views:—

Figure 1 is a front elevation of a stove provided with my device;

Fig. 2 is a vertical sectional view taken upon line 2—2 of Fig. 1;

Fig. 5 is a plan view of a corner portion of one of the heat-baffles employed partially broken away.

Figure 3:
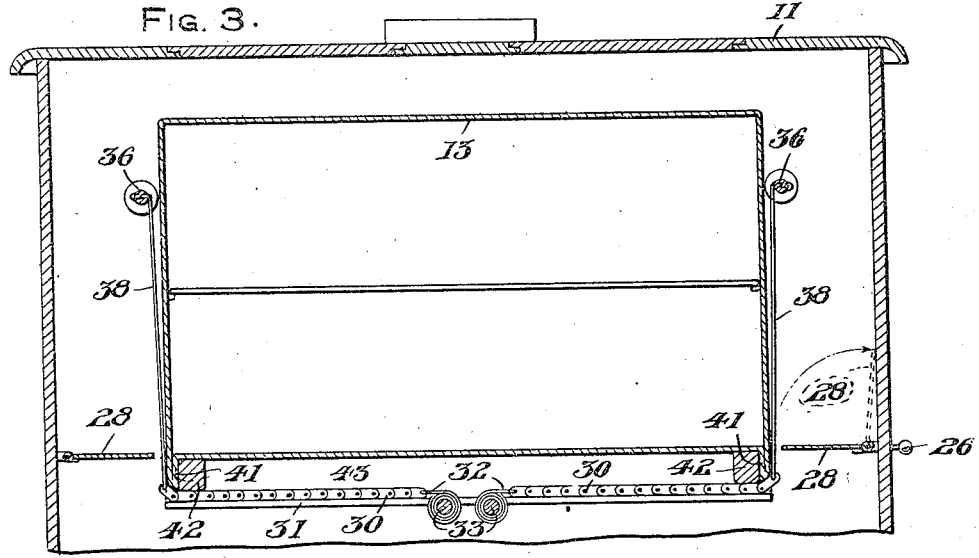
Fig. 3 is a vertical transverse sectional view thereof taken upon line 3—3 of Fig. 4.
Figure 4:
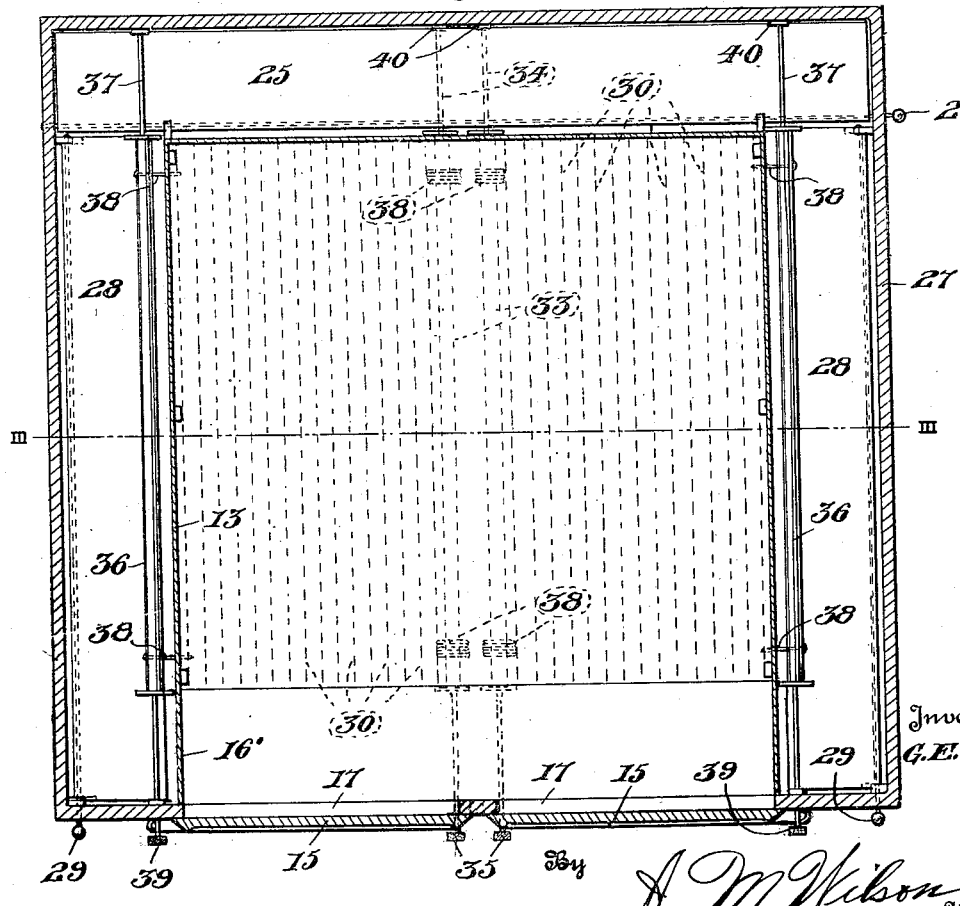
Fig. 4 is a horizontal sectional view of the device.

My invention is adapted for employment with a cooking stove such as the box form of stove 10 having a top 11 with an outlet flue 12 centrally positioned at the rear portion thereof while an oven 13 is arranged substantially centrally within the stove 10 at a point above the burning grate 14 of the stove.

Two entrance doors 15 are provided in the front 16 of the stove for gaining access to the interior of the oven 13 through a tubular approach 16′ connecting the oven with the door opening 17. A usual door 18 is provided in the front of the stove above the level of the grate 14 while a door 19 permits access to the ash-pit 20 beneath the grate. Suitable latches 21 and 22 are provided for the doors 15 and 18 respectively while a thermometer 23 is provided for one of each set of doors and a ventilating slide 24 is arranged for each of the ash-pit doors 19.

A damper 25 in the form of a hinged plate is arranged at the rear of the oven 13 beneath the outlet flue 12 having an operating knob 26 arranged outwardly of the adjacent side 27 of the stove. Similar plate-dampers 28 are arranged between the opposite sides of the oven 13 and the sides of the stove, similarly operable by means of handles 29 arranged forwardly of the stove front 16. It will be seen that by closing all of the dampers 25 and 28 to their horizontal positions, the products of combustion and heat will be prevented from escaping through the flue 12 as the approach 16′ prevents the upward flow thereof between the oven 13 and the stove front 16. By opening one or more of the dampers 25 and 28, the passage of the products of combustion to the outlet flue 12 may be regulated and the heating of the oven 13 partly controlled thereby, it being understood that a draft for the grate 14 is provided by controlling the slides 24.

Two oppositely arranged baffles or heat-shields 30, somewhat of the form of metal Venetian blinds are arranged for movement beneath the oven 13 from opposite sides thereof and arranged upon depending ledges or members 31 carried by the oven when in their operative positions above the grate 14, as best illustrated in Fig. 3 of the drawings. Operating wires 32 are connected to the adjacent ends of the shields 30 wound upon drums 33 carried by shafts 34 centrally arranged beneath the oven 13 and having handles 35 upon their forward ends exteriorly of the stove front 16. Similar drums 36 are arranged upon rods 37 adjacent opposite sides of the oven 13 with flexible metal connectors 38 wound thereon and connected to the opposite outer ends of the shields 30. Operating knobs 39 are provided upon the outer ends of the rods 37 forwardly of the stove front 16 and whereby the connectors 38 may be wound upon the drums 36 for moving the shields 30 from beneath the oven 13 and upwardly along the opposite sides thereof in their retracted inoperative positions. Each of the shafts 34 and 37 is provided with suitable friction bearings 40 at their rear ends adapted for maintaining the drums 33 and 36 in any adjusted position to which the same may be turned by means of their respective knobs 35 and 39 and with the shields 30 adjusted at any desired point within their paths of travel adjacent the sides and lower opposite corners of the oven 13.

It will be seen that the flexible nature of the baffles 30 permits the same to slide over the opposite lower corner flanges 41 of the oven 13, and which flanges are spaced from the guide members 31 heretofore referred to while beams 42 are arranged inwardly of the flanges 41 connecting together the depending portions 43 of the oven which carry the said guide flanges 31. When it is desired to decrease the temperature in the oven 13 without in any manner changing or regulating the fire upon the burning grate 14, the baffles 30 are suitably operated by means of the knobs 35 and 39, it being understood that when the baffles are arranged beneath the oven 13, the heating of the oven from the fire will be decreased while the full force of the fire from the grate 14 will be permitted to come in direct contact with the oven 13 when the baffles 30 are retracted. The dampers 25 and 28 may be adjusted for regulating the draft and the burning of the fire upon the grate 14 irrespective of the operation of the baffles 30.

A serviceable stove is arranged adapted for advantageously controlling the temperature of the baking section while the burning of the fire may also be regulated at will.

What I claim as new is:—

1. In combination with a stove having a burning grate and an outlet flue at the top of the stove, an oven arranged within the stove above the grate, dampers at the opposite sides and rear end of the oven adapted for controlling the products of combustion from the grate to the flue, flexible heat-shields shiftably arranged adjacent the lower opposite edges of the oven adapted for substantially horizontal arrangement beneath the oven and above the grate when in their operative arrangement, and operating means for the said shields.

2. In combination with a stove having a burning grate and an outlet flue in the top of the stove, an oven arranged substantially centrally within the stove above the grate having an approach portion connected to the front of the stove, depending portions at the opposite sides of the oven arranged with inwardly projecting guides, flexible heat-shields normally adjustably mounted upon the said guides between the grate and oven adapted for movement around the lower opposite edges of the oven, winding drums journaled within the stove at points substantially centrally beneath the oven and similar drums arranged adjacent the opposite sides of the stove, connecting means between the opposite ends of said shields and the said drums, and operating means for the drums terminating forwardly of the stove front.

3. In combination with a stove having a burning grate and an outlet flue in the top of the stove, an oven arranged substantially centrally within the stove above the grate having an approach portion connected to the front of the stove, depending portions at the opposite sides of the oven arranged with inwardly projecting guides, flexible heat-shields normally adjustably mounted upon the said guides between the grate and oven adapted for movement around the lower opposite edges of the oven, winding drums journaled within the stove at points substantially centrally beneath the oven and similar drums arranged adjacent the opposite sides of the stove, connecting means between the opposite ends of said shields and the said drums, operating means for the drums terminating forwardly of the stove front whereby the shields may be shifted in and out of their operative positions beneath the oven, dampers hinged within the stove between the opposite sides and rear end of the oven and the adjacent walls of the stove, and operating means for the said dampers whereby the products of combustion are adapted to be controlled in their passage from the grate to said flue.

In testimony whereof I affix my signature.

GEORGI E. WASON.